UNITED STATES PATENT OFFICE.

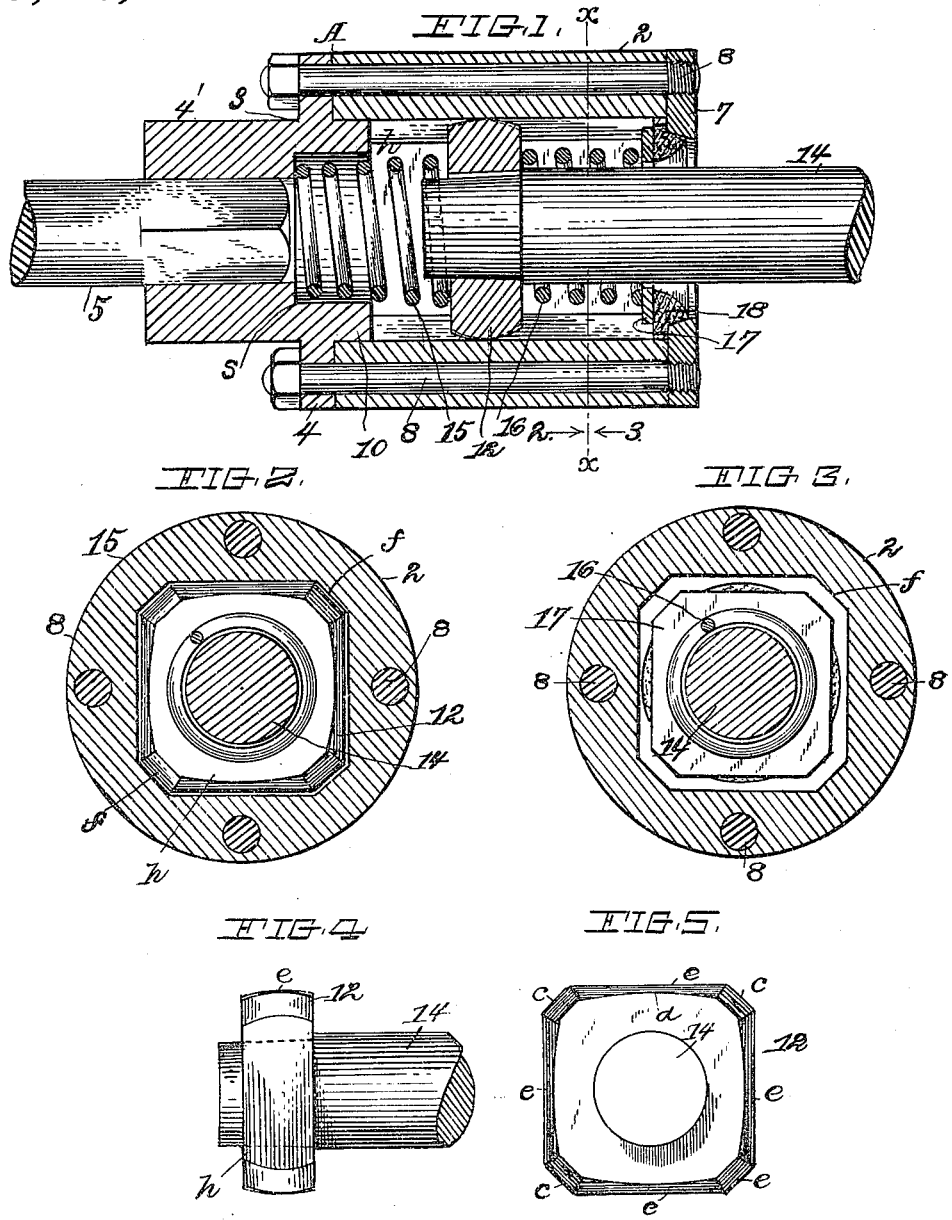
D. F. JONES.
UNIVERSAL JOINT OR COUPLING.
APPLICATION FILED MAY 2, 1917.
1,287,030.
Patented Dec. 10, 1918.
Inventor
David F. Jones.

DAVID F. JONES, OF CLEVELAND, OHIO.

UNIVERSAL JOINT OR COUPLING.

1,287,030.   Specification of Letters Patent.   Patented Dec. 10, 1918.

Application filed May 2, 1917. Serial No. 165,806.

*To all whom it may concern:*

Be it known that I, DAVID F. JONES, citizen of the United States, residing at Cleveland, in the county of Cuyahoga and State of Ohio, have invented certain new and useful Improvements in Universal Joints for Couplings, of which the following is a specification.

This invention pertains to a universal joint or coupling, and the invention consists in a coupling or joint having a substantially rectangular socket and a substantially rectangular head in universal joint relations therewith and adapted to be used for power purposes substantially as shown and described and particularly pointed out in the claim.

In the accompanying drawings, Figure 1 is a sectional elevation through the middle of the coupling or joint lengthwise. Fig. 2 is a cross section on line $x$—$x$, Fig. 1, looking inward, and Fig. 3 is a cross sectional view on the same line looking outward. Fig. 4 is an edge view of the so-called coupling head and a section of the shaft carrying the same, and Fig. 5 is a side elevation of the said head without the shaft.

The invention as thus shown is comprised broadly in two members, the external member A having a socket preferably rectangular or square in cross section and of suitable depth, and the internal member 12 shaped to a practically close fitting relation at its edges to the walls of the socket and yet adapted to a universal joint movement therein.

The term square or rectangular is employed because it defines the actual construction or shape of both said socket and said head as shown herein, less the fillets in the angles of the sockets and the rounded corners on the head to correspond therewith and as hereinafter more fully described.

The said socket member is designated as a whole by A but is constituted of several separate parts comprising a body or barrel 2, which also is the real socket portion, the end part 3 which has a flange 4 about the same to which said body is bolted and a neck portion 4' in which the shaft 5 is rigidly secured, and an inside cavity or recess to seat a spring, as will be seen further along. The opposite end of body 2 is provided with a ring-shaped plate 7 which partially overlaps the socket in said body and is clamped thereon with the part 3 at the other end by the bolts 8, thus making a unitary member A in so far as operation is concerned.

The socket proper in the body 2 extends the full length thereof and is square in cross section, as above described, having four equal flat sides with fillets $f$ in the angles or corners, and the inner portion 10 of the end part 3 extends into this socket a slight distance as shown but leaves the socket otherwise free for the operations of the head 12.

The said head alone constitutes the inner joint or coupling member, and is fixed rigidly and permanently upon the end of shaft 14 between two spiral springs 15 and 16, respectively bearing against opposite sides thereof and which have their outer bearings practically against the ends of the socket, or, to be more explicit, the spring 15 is seated in a cavity in the end 10 of the part 3 while the spring 16 bears against a washer 17 which overlies the packing ring 18 between the same and the outer ring 7 and serves as a packing about the shaft 14. Possibly at this point it should be stated that I provide the socket with a liberal supply of a suitable lubricant so that in any event there shall be a minimum of wear in the parts and a quiet operation.

Now, especial attention is called to the features characteristic of the head $h$ which are necessary to make it practical as a universal joint member in a square socket bearing. In the first place it is to be understood that the socket shown is a perfect square in cross section, less the fillets $f$ in the corners, and that the top and middle or center of each of the four equal edges $e$ of head $h$ make a practically close working engagement with the four sides of the socket, the corners thereof being removed and shaped as seen at $c$ to fit said fillets. Otherwise the said edges $e$ are crowned laterally or from side to side of the head as seen in Fig. 4, but the crowning of said edges is slightly but visibly increased from the middle transverse portion thereof to the respective ends of said edges as seen most clearly in the curved inner line $d$ in Fig. 5, and so that if a straight edge were laid lengthwise on the surface $d$ it would rock slightly thereon. Both sides of each edge $e$ are rounded in this way between their ends, with the obvious purpose of giving said head the required orbital movement to perform its functions as the rocking joint member and still hold its straight driving relations along its straight top portions with the walls of the socket. The fillet corners $f$ in the socket and the rounded corners $c$ of the head contribute to the universal rocking action of the head, but if the fillet angles or corners were actually square the rounding of corners $c$ would not be required. Of course the depth of the head $h$ from side to side is something of a factor in the construction, and the proportions shown are good to be observed.

An obvious modification of the socket might be made with hexagonal or octagonal sides and is understood to be embraced within the present application, but the simpler form shown is preferred for both manufacturing and operating reasons.

Steadiness in the action of the joint is promoted by the springs 15 and 16.

What I claim is:

A universal joint as described, having an outer inclosing member provided with a flat sided socket, an inner joint member having straight edges engaging the sides of said socket and adapted to slide and rock thereon, and opposed springs bearing against the sides of said inner joint member.

Signed at Cleveland, in the county of Cuyahoga, and State of Ohio, this 26th day of April, 1917.

DAVID F. JONES.